US006724152B2

(12) United States Patent
Nostwick

(10) Patent No.: US 6,724,152 B2
(45) Date of Patent: Apr. 20, 2004

(54) LIGHTING CONTROL SYSTEM WITH VARIABLE ARC CONTROL INCLUDING START-UP CIRCUIT FOR PROVIDING A BIAS VOLTAGE SUPPLY

(75) Inventor: Allan Albert Nostwick, Huntington, IN (US)

(73) Assignees: Donald K. Gladding; Ronald K. Gaskill, Sun City West, AR (US)

( * ) Notice: Subject to any disclaimer, the term of this patent is extended or adjusted under 35 U.S.C. 154(b) by 0 days.

(21) Appl. No.: 10/197,836

(22) Filed: Jul. 19, 2002

(65) Prior Publication Data

US 2004/0012343 A1 Jan. 22, 2004

(51) Int. Cl.[7] .......................... H05B 37/00; H02M 5/45

(52) U.S. Cl. .................. 315/207; 315/206; 315/200 R; 315/247; 315/291; 363/37; 363/44; 363/84

(58) Field of Search ............................ 315/200 R, 203, 315/205–207, 246, 247, 291, 312, 324, DIG. 5, DIG. 7; 363/44, 52, 53, 37, 84, 86, 87, 88, 114

(56) References Cited

U.S. PATENT DOCUMENTS 5,483,127 A * 1/1996 Widmayer et al. .......... 315/307
5,568,041 A * 10/1996 Hesterman .................. 323/207
6,011,357 A * 1/2000 Gradzki et al. ............. 315/224
6,049,472 A * 4/2000 Suzuki et al. ................ 363/37

* cited by examiner

*Primary Examiner*—Tuyet T. Vo
(74) *Attorney, Agent, or Firm*—Miles & Stockbridge P.C.; James T. Carmichael

(57) ABSTRACT

A lighting control system provides variable arc current to one or more fluorescent gas discharge lamps and provides a heating voltage to the lamp electrodes. The system includes a start-up circuit which includes circuitry for providing a starting voltage to an output power conditioning circuit. The latter drives a switching unit to control the application of DC power to the fluorescent gas discharge lamps and to provide an operating voltage to an input power factor correction circuit. The input power factor correction circuit boosts the converted DC power and the operating voltage. The start-up circuit includes a plurality of voltage doubling rectifier circuits and a plurality of zener diodes which receive the operating voltage and are electrically connected to the input power factor correction circuit and the output power conditioning unit so as to provide a regulated bias voltage supply to the output power conditioning unit and to the input power factor correction circuit.

20 Claims, 2 Drawing Sheets

LIGHTING CONTROL SYSTEM WITH VARIABLE ARC CONTROL INCLUDING START-UP CIRCUIT FOR PROVIDING A BIAS VOLTAGE SUPPLY

FIELD OF INVENTION

The present invention relates to lighting control systems and, more particularly, relates to a control system for providing variable arc current to one or more fluorescent lamps, including an improved start-up circuit for providing a bias voltage supply to various system components.

BACKGROUND OF THE INVENTION

Fluorescent lamps are gas discharge lamps that are based on Hg vapor which, when excited, provides a low intensity spectral line of visible light and several high intensity lines of ultra-violet light, that are converted to visible light by the phosphor coating on the interior surface of the lamps. Fluorescent lamps were perfected as an alternative to incandescent lamps, and have since replaced the incandescent lamps in most commercial and industrial applications. The fluorescent lamp has a substantially longer life than the incandescent lamp which results in reduced maintenance costs. The fluorescent lamp also provides a more distributive light source which is two to six times more efficient than incandescent lighting in terms of luminous flux per unit of electric power consumed.

Since the fluorescent lamp has no inherent current limiting mechanism when operated by a voltage source, the fluorescent lamp requires an auxiliary device to first ignite the lamp arc and then, after ignition has occurred, to control the amplitude of the arc current. Without an auxiliary device to stabilize or limit the arc current, the lamp arc would exceed its current rating and thus, the fluorescent lamp would be damaged. In conventional systems the auxiliary device has been combined into a single device called a ballast. The ballast provides a means for igniting the lamp arc and also provides a fixed value of arc current to the lamps. A shortcoming of the fixed value of arc current lighting is that it wastes energy. Underlighted conditions are often due to light absorbing dust on the lamp and the deterioration of the phosphor coating on the inside wall of the fluorescent tube. To reduce the effect of the underlighted conditions, designers overlight the area when the lamps are new and lumina are clean so there is still sufficient light remaining when lamp light output reaches depreciated states. Therefore, much of the electric energy that can be saved by using fluorescent lighting is lost due to the industrial practices of maintaining the use of fixed value arc current lamp operation.

One prior art technique used to reduce wasteful overlighting and promote energy savings is disclosed in U.S. Pat. No. 5,483,127 to Widmayer et al. The Widmayer et al. patent discloses a fluorescent lighting control system which automatically adjusts the arc current to a fluorescent gas discharge lamp. The variable arc current lighting system includes a sensor that senses ambient light and the output light of the lamp and provides a corresponding electrical signal to an electronic circuit. The electronic circuit controls the frequency of repetition of alternating on-off periods of electronic switches. As the frequency of switching the electronic switches is increased or decreased, the effective impedance value of the current limiting inductances that are connected in series with each lamp is controlled. Thus, the current amplitude is increased or decreased by controlling the switching frequency of the electronic switches. By reducing the arc current supplied to a fluorescent lamp, the lamp operates at less than rated wattage thereby reducing electrical consumption. The variable-arc lighting system also includes a start-up circuit which provides a voltage supply to the internal electronic circuits. However, this lighting control system is complex, expensive to produce and difficult to troubleshoot and repair.

Another prior art variable-arc lighting system is the Mark VII system made by Precision Lighting, Inc., of Rockville, Md. The Mark VII system operates on the same principle as the Widmayer et al. patent, but has been simplified to reduce cost and size. The Mark VII system includes electronic circuits that control the switching frequency of electronic switches in order to control the arc current in a fluorescent lamp. The Mark VII system also includes a start-up circuit which provides a voltage supply to various internal electronic circuits.

One disadvantage of the start-up circuits in the Widmayer et al. patent and in the Mark VII system is that the start-up circuits are generally unreliable. The start-up circuit includes a power transistor that is driven on and off to provide a voltage supply to the internal electronic circuits. When the start-up circuit has completed its operation, and the ballast is in normal operation, there is a continuous high voltage present on the power transistor. The high voltage exceeds the rating of the power transistor and over a period of time the power transistor can be damaged. Replacing the power transistor with a different type of transistor having higher voltage ratings would require a different control circuit, thus increasing the need for circuit components and, as a result, increasing costs.

Another disadvantage of the start-up circuits in the Widmayer et al. patent and in the Mark VII system is that the power transistor is not always capable of being turned off when the main input voltage source is abnormally low. If the power transistor remains on or in a conducting state for a considerable time period, the electronic elements and circuits which are electrically connected to the power transistors will receive continuous current. These electronic elements and circuits, and the transistor itself, can be damaged as a result of overheating due to the continuous current flow.

A further disadvantage of the start-up circuits in the Widmayer et al patent and in the Mark VII system is that the start-up circuit includes a single rectifier bridge in order to provide a bias voltage to multiple electronic circuits and as a consequence, the multiple electronic circuits are not electrically isolated from each other, so that the unequal voltage requirements of the different circuits is not easily provided for.

SUMMARY OF THE INVENTION

In accordance with the present invention, there is provided a control system for providing variable arc current control of a lighting system, said control system comprising: an input power factor correction means including means for converting AC power from an AC power source into converted DC power, said input power factor correction means boosting said converted DC power so as to provide boosted converted DC power; a lamp unit comprising at least one fluorescent gas discharge lamp; switching means for controlling application of said boosted converted DC power to said lamp unit; an output power conditioning means, connected to said input power factor correction means and to said switching means, for controlling operation of said switching means so as to control application of said converted DC power to said lamp unit; and a start-up circuit including a starting means for providing a starting voltage to said output power conditioning means, said start-up circuit further comprising a plurality of voltage doubling rectifier circuits for providing a bias voltage supply to said output power conditioning means and to said input power factor correction means.

Advantageously, one of the plurality of voltage doubling rectifier circuits of the start-up circuit is electrically connected to the input power factor correction means and a further one of the plurality of voltage doubling rectifier circuits of the start-up circuit is electrically connected to the output power conditioning means.

Preferably, one of the plurality of voltage doubling rectifier circuits comprises a first pair of diodes and a further one of said plurality of voltage doubling rectifier circuits comprises a second pair of diodes.

Preferably, the starting means includes a resistor electrically connected in series with a capacitor for providing a starting voltage to the output power conditioning means.

Advantageously, the start-up circuit includes a first zener diode electrically connected to the input power factor correction means so as to limit and regulate said bias voltage supply and the start-up circuit also includes a second zener diode electrically connected to the output power conditioning means so as to limit and regulate said bias voltage supply.

Advantageously, at least one fluorescent gas discharge lamp includes electrodes and the output power conditioning means supplies a heating voltage for said electrodes of said at least one arc discharge lamp.

Preferably, the output power conditioning means supplies arc current for said lamp unit and the input power factor correction means and the output power conditioning means comprise integrated circuits.

Advantageously, the switching means provides alternate application of positive and negative DC voltages to the lamp unit.

Preferably, the input power factor correction means includes an analog multiplier connected to a switching transistor for driving said switching transistor with a variable frequency pulse in order to control boosting of said converted DC power.

Advantageously, the output power conditioning means further comprises a feedback means for sensing light of said lamp unit and automatically adjusting the current level supplied to said lamp unit in accordance with the sensed light of said lamp unit.

Preferably, said feedback means includes at least one photoresistor electrically connected to at least one capacitor in order to form an RC time constant circuit.

In accordance with another aspect of the invention, there is provided a control system for providing variable arc current control of a lighting system, said control system comprising: an input power factor correction means including a means for converting AC power from an AC power source into converted DC power, said input power factor correction means boosting said converted DC power so as to provide boosted converted DC power; at least one lamp unit comprising at least one fluorescent gas discharge lamp including electrodes; a main output transformer having a primary winding and at least one secondary winding, said primary winding being connected to said input power factor correction means and said at least one secondary winding being connected to said electrodes and to said at least one lamp unit; a switching means connected to said primary winding of said main output transformer; output power conditioning means, connected to said input power factor correction means, and to said switching means, for controlling said switching means to provide voltage to said primary winding of said main output transformer so as to produce a resultant voltage on said at least one secondary winding of said main output transformer and thus provide a heating voltage to said electrodes and variable arc current to said at least one lamp unit; and a start-up circuit including a starting means for providing a starting voltage to said output power conditioning means, said start-up circuit further comprising a plurality of voltage doubling rectifier circuits for providing a bias voltage supply to said output power conditioning means and to said input power factor correction means.

Preferably, the starting means includes a resistor electrically connected in series with a capacitor for providing a starting voltage to the output power conditioning means.

Advantageously, the start-up circuit includes a first zener diode electrically connected to the input power factor correction means so as to limit and regulate said bias voltage supply and the start-up circuit includes a second zener diode electrically connected to said output power conditioning means so as to limit and regulate said bias voltage supply.

In accordance with a further aspect of the invention, there is provided a control system for providing variable arc control of a lighting system including at least one lamp unit, said control system comprising: converting means for converting AC power from an AC power source into converted DC power, said converting means including an input power factor correction means for boosting said converted DC power to produce boosted DC power; switching means for controlling application of said converted DC power to the at least one lamp unit;

output power conditioning means connected to said switching means for controlling operation of said switching means; and a start-up circuit connected to said input power factor correction means and to said output power conditioning means, said start-up circuit including:

a starting means for providing a starting voltage to said output power conditioning means so as to control said switching means to provide an operating voltage to said input power factor correction means to produce a boosted operating voltage;

a first voltage doubling rectifier circuit and a first zener diode electrically connected to said input power factor correction means for receiving said boosted operating voltage and for providing a regulated bias voltage supply to said input power factor correction means; and a second voltage doubling rectifier circuit and a second zener diode electrically connected to said output power conditioning means for receiving said boosted operating voltage and for providing a regulated bias voltage supply to said output power conditioning means.

Further features and advantages of the present invention will be set forth in, or apparent from, the detailed description of preferred embodiments thereof which follows.

DESCRIPTION OF THE PREFERRED EMBODIMENTS OF THE INVENTION

Figure 1:
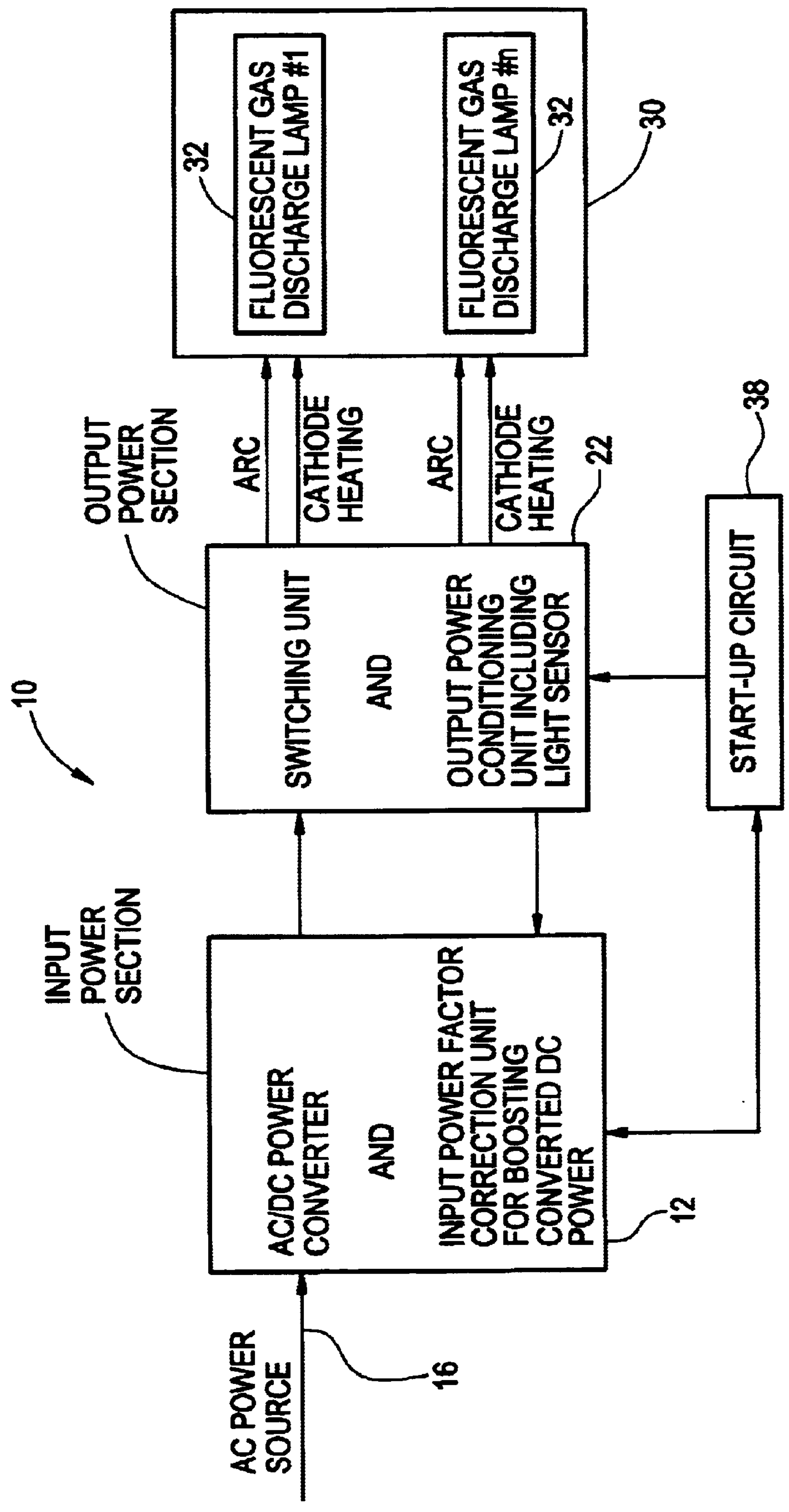
FIG. 1 is a block diagram showing the basic components of a light control system incorporating a start-up circuit in accordance with a preferred embodiment of the invention.
Figure 2:
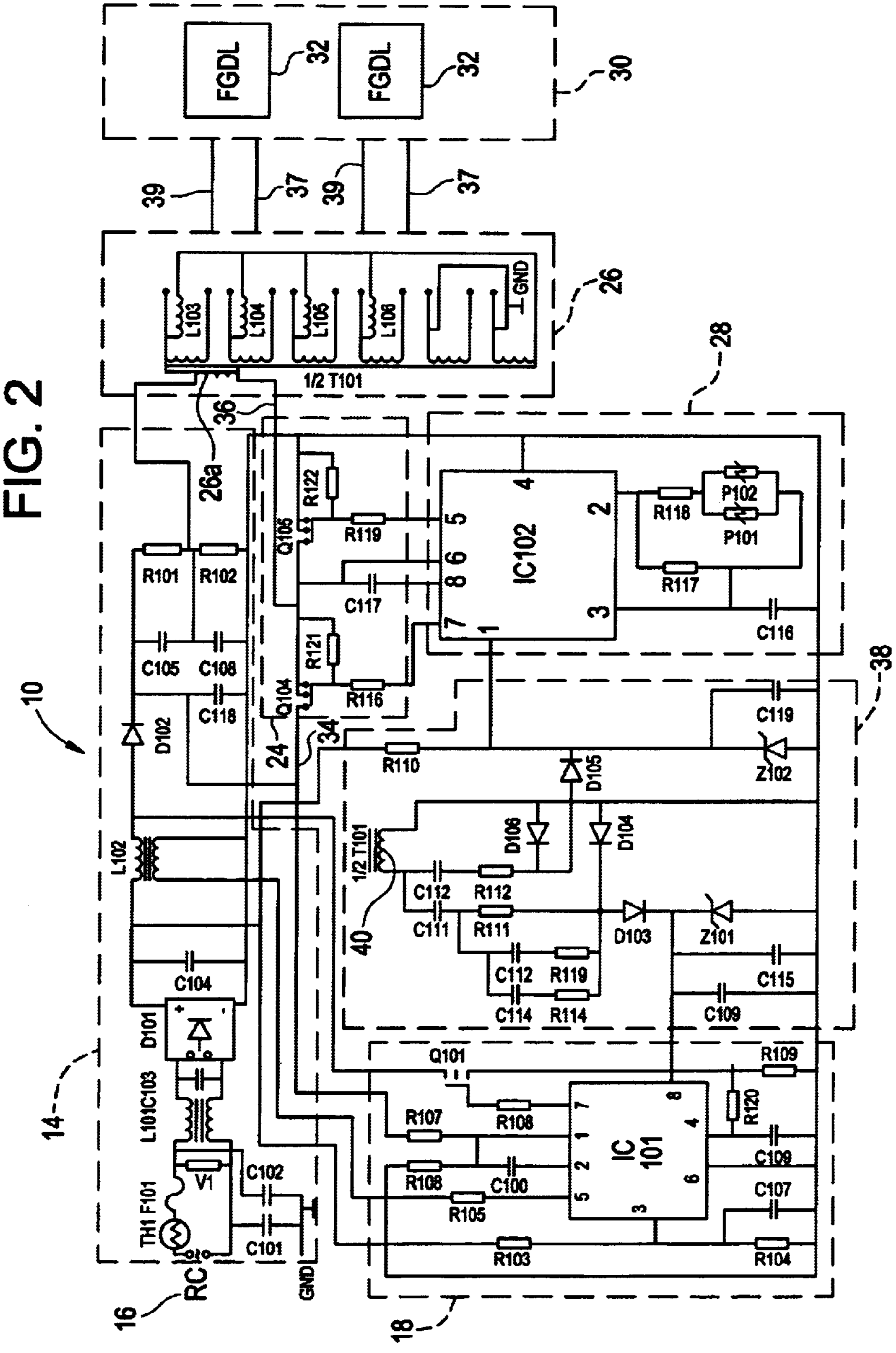
FIG. 2 is a schematic diagram of the lighting control system of FIG. 1, illustrating a preferred embodiment thereof.

Referring to FIGS. 1 and 2, there is shown a control system for providing variable arc control of a lighting system. The control system, which is generally denoted 10, basically comprises an input power section 12 which includes a power converter 14 for converting AC power to DC power. The power converter 14 is electrically connected to an AC power source 16. As shown in FIG. 2, power converter 14 comprises a thermistor TH1 to limit inrush current amplitude upon application of input power, a varactor V1, for protecting the control system 10 from input transients, a fuse F101 to prevent combustion of the circuit board and possible danger of fire to nearby materials in the event of a major circuit failure, energy storage capacitors C105 and C106, high frequency suppression capacitor C118, inductors L101 and L102, radio frequency suppression capacitors C101, C102 and C109, a bridge rectifier D101, diode D102, and resistors R101 and R102, all of which are electrically connected as shown in FIG. 2.

The power converter 14 uses the bridge rectifier D101 to rectify input AC power from source 16 into converted DC power. Capacitors C103 and C104 are electrically connected to the bridge rectifier D101 to filter noise and radio interference. However, capacitors C103 and C104 provide no significant DC filtering. The converted DC power is subsequently fed to inductor L102.

The power section 12 also includes an input power factor correction section 18. The input power factor correction section 18 comprises a power factor correcting integrated circuit IC101, resistors R103–R109, and R120 used in combination with capacitors C107–C109 to provide time constants, voltage division and current limiting, and a switching transistor Q101, all electrically connected as shown in FIG. 2. The switching transistor Q101 is also connected to inductor L102 of the power converter 14. In a non-limiting example, the power factor correcting circuit IC101 may comprise integrated circuit, L6560, which is manufactured by the STMicroelectronics Corporation, although, of course, other standard power factor correction circuits can also be used.

The input power factor correction section 18 operates as a boost converter which is capable of absorbing energy from the AC power source 16 where the instantaneous voltage varies over a wide range, and to supply an output voltage that is greater than the highest value of the input voltage. The input power factor correction section 18 controls the on and off time period of the switching transistor Q101. Transistor Q101 is controlled to connect and disconnect one side of inductor L102 directly across the input voltage supply in order to cause the inductor current to increase as long as Q101 is conducting. Following this, conduction in Q101 is terminated, allowing the drain voltage to rise until current flows through diode D102 into an output storage capacitor C118. Current through inductor L102 increases from zero to a maximum value while the switching transistor Q101 is on. The current through inductor L102 then decreases to zero when the switching transistor Q101 is nonconducting or off, in accordance with the relationship $di/dt=E/L$. The positive output of the bridge rectifier D101 is connected to the input side of the inductor L102 while the negative output of the bridge rectifier D101 is connected to the source or emitter of the switching transistor Q101 and to the negative side of the output storage capacitor C118.

The input power factor correction section 18 boosts the converted DC power by driving the switching transistor Q101 on and off with a variable frequency square wave. The switching transistor Q101 is driven on and off in the order of 20,000 to 50,000 times per second, with a variable pulse width. The pulse width is adjusted so as to cause the average current in inductor L102 to vary in a manner that is proportional to the instantaneous value of the rectified voltage on the output of the bridge rectifier D101. The pulse width is simultaneously adjusted as required to maintain the DC voltage present on the output high frequency suppression capacitor C118 at a constant value, that value being chosen larger than the maximum expected value of voltage to be supplied by the input bridge rectifier D101.

A sample of the input voltage is taken from the bridge rectifier D101 and fed to one input of an analog multiplier, which is included in the input power factor correction section 18. Another input of the analog multiplier receives an error signal that is proportional to the difference between the average voltage present on the output capacitor C118 and the pre-set value of said voltage for which the system is designed. After receiving the sample and error signal, the analog multiplier generates a corresponding analog signal with a similar wave shape as that of the bridge rectifier D101 output voltage but varying in amplitude according to the value of the error signal. The analog signal is used to modulate the pulse width, which drives switching transistor Q101.

Pulse width control is accomplished on the basis of sensing the rising source current of the power switching transistor Q101 while the switching transistor Q101 is conducting, and subsequently terminating each gate driven pulse when the source current reaches a value that is proportional to the analog multiplier output voltage. The switching transistor Q101 remains off until a signal, which is obtained from a sensing winding on the inductor L102, is detected by the power factor correcting circuit IC101. The signal occurs when the current in the inductor L102 has decayed to essentially zero and a reverse voltage occurs across the output diode D102. The signal from the sensing winding of inductor L102 then drops from a positive value to approximately zero and at that point, the switching transistor Q101 is turned on. In this mode of operation, the average inductor L102 current is not determined specifically, but it is assumed that if the switching transistor Q101 is turned on at the exact time that the inductor L102 current has fallen to zero, the average current will be linearly proportional to the peak current which is sensed directly. It will be appreciated to one of ordinary skill in the art that although the power converter means 14 and the input power factor correction section 18 are shown as two separate circuits in FIG. 2, it is possible to combine the two circuits into a single circuit or unit.

The control system 10 further comprises an output power section 22 which includes, as shown in FIG. 2, a switching unit 24, a main output transformer 26 and an output power conditioning control section 28. The control system 10 also comprises a lamp unit 30 which is electrically connected to a plurality of secondary windings of the main output transformer 26 (FIG. 2). The lamp unit 30 includes at least one fluorescent gas discharge lamps 32, such a lamp being hereafter referred to as an FGDL. Each individual FGDL 32 includes heating electrodes.

As shown in FIG. 2, the switching unit 24 comprises a half bridge which includes power transistors Q104 and Q105. The switching unit 24 also includes resistors R116, R119, R121 and R122 and capacitor C117, all of which are electrically connected as shown in FIG. 2. The switching unit 24 is connected to the input power factor correction section 18, via input lead 34, and to the main output transformer 26, via output lead 36. In addition, the switching unit 24 is connected to the output power conditioning control section 28.

The main output transformer 26 comprises a primary winding 26*a* and a plurality of secondary windings, as shown. One side of the primary winding 26*a* is electrically connected to the power converter 14 and the other side of the primary winding 26*a* is electrically connected to output lead 36 of the switching unit 24. Each one of the secondary windings supplies a heating voltage on a respective output line 37 to an electrode of a corresponding FGDL 32. An arc control voltage is supplied from the secondary windings of transformer 26 on a respective output line 39 to a corresponding FGDL 32.

Providing a heating voltage to the electrodes of the FGDL 32 is essential to improving the life of the FGDL 32. The heating voltage is applied to the electrodes of FGDL 32 prior to arc ignition of the FGDL 32.

The arc current supplied over respective lines 39 to each corresponding FGDL 32 passes through individual current limiting inductors L103 through L106, as shown. Individual current limiting inductors L103–L106 are respectively connected to corresponding FGDL 32 in order to protect each FGDL 32 from damage as a result of high arc current, and facilitate the control of arc current by changing the frequency. The arc current is adjusted by the output power conditioning section 28 which controls the switching frequency of the power transistors Q104 and Q105. The current limiting inductors L103–L06 present an impedance that varies in direct proportion to the frequency, with the resulting current varying in an inverse proportion.

The output power conditioning section 28 comprises an output control integrated circuit IC102 which includes a driving circuit combined with an oscillating circuit. The output power conditioning control section 28 also comprises resistors R117 and R118, capacitor C116 and photoresistors P101 and P102, all of which are electrically connected as shown in FIG. 2. In a non-limiting example, the output control circuit IC102 may comprise integrated circuit L6569A which is manufactured by the STMicroelectronics Corporation.

The output control circuit IC102 drives power transistors Q104 and Q105 so as to alternately switch the output lead 36 between a positive DC input voltage and the negative return. The DC component is blocked by a coupling or blocking capacitor circuit which consists of two energy storage capacitors C105 and C106 electrically connected in series. The alternate switching of output lead 36 produces a square wave voltage which is centered around zero and is applied to the primary winding of the main output transformer 26. As shown in FIG. 2, one side of the primary winding of the main output transformer 26 is connected to the switching means 24, via the output lead 36, and the other side of the primary winding is connected to the DC blocking or coupling capacitors C105 and C106.

An RC time constant circuit determines the frequency at which the output control circuit IC102 drives the power transistors Q104 and Q105. Both the resistor (R) and capacitor (C) components are external to the output control circuit IC102. The RC time constant circuit includes a feedback sensing means. In the non-limiting example illustrated, the feedback sensing means includes photoresistors P101 and P102 which are connected to resistors R117 and R118 and capacitor C116. The photoresistors P101 and P102 are physically positioned near to the FGDL 32 in order to sense a summation of the output light produced by the FGDL 32 and the ambient light arriving from other sources. As the light produced by the FGDL 32 increases, the resistance of each of the photoresistors P101 and P102 decreases in value. The decrease in value of the resistance of the photoresistors P101 and P102 causes the output control circuit IC102 to increase the switching frequency of the power transistors Q104 and Q105 thereby reducing output current and the amount by which the output light of the FGDL 32 will increase. It will be appreciated by those of ordinary skill in the art that other circuit elements and configurations could be used to sense the output light of the FGDL 32 in order to control the switching frequency of the power transistors Q104 and Q105.

The output control circuit IC102 is isolated from the floating source electrode of the power transistor Q104 by a special high side driver included in IC102. The output control circuit IC102 includes a timing section which serves to alternately turn each power transistor Q104 and Q105 on and off. Power transistor Q104 is turned off a short time before power transistor Q105 is turned on, and power transistor Q105 is turned off a short time before power transistor Q104 is turned on. This driving sequencing of the power transistors Q104 and Q105 allows for inductive commutation of the output voltage with minimal power dissipation in the power transistors Q104 and Q105, thereby avoiding any possibility of simultaneous conduction in the two power transistors Q104 and Q105 since this would destroy the power transistors.

In summary, adjusting the brightness of the FGDL 32 is accomplished by varying the arc current to the FGDL 32 and as described above, and adjusting the arc current to the FGDL 32 is accomplished by varying the switching frequency of the power transistors Q104 and Q105.

As described above in connection with FIG. 1, the control system 10, as shown in FIG. 2, includes a start-up circuit 38 for providing a low voltage supply or bias supply to the power factor correcting circuit IC101 of the input power factor correction section 18 and to the output control circuit IC102 of the output power conditioning section 28.

The start-up circuit 38 includes resistors R110–R114, capacitors C110–C115, C119, rectifying diodes D103–D106, and zener diodes Z101 and Z102, all electrically connected as shown in FIG. 2. The start-up circuit 38 derives its source voltage from one of the secondary windings of the main output transformer 26. Voltage doubling rectifier circuits are electrically connected to a secondary winding of the main output transformer 26 in order to rectify the voltage present on the secondary winding. A first one of these voltage doubling rectifier circuits, which includes rectifying diodes D103 and D104, is connected to the input power factor correction section 18 in order to provide a bias voltage supply to the power factor correcting circuit IC101. A second voltage doubling rectifier circuit, which includes rectifying diodes D105 and D106, is connected to the output power conditioning section 28 in order to provide a bias voltage supply to the output control circuit IC102. Separate voltage doubling rectifier circuits are used for the input power factor correction section 18 and the output power conditioning section 28 in order to isolate the two sections from each other and to minimize pre-start current. The voltage doubling configuration is employed here to take advantage of the property of having a single driving input connection into which current limiting impedances can readily be inserted.

The start-up circuit 38 utilizes the hysteretic property of the output control circuit IC102. The start-up circuit includes starting circuitry comprising resistor R110 and capacitor C119. Resistor R110 is electrically connected to the input power factor correction section 18 and power converter 14. The resistor R110 is electrically connected in series with capacitor C119 and both the resistor R110 and capacitor C119 are connected to the output power conditioning section 28. At initial start-up, current flows through resistor R110 and capacitor C119, the current charges capacitor C119 and a starting voltage is supplied to operate the output control circuit IC102. The starting voltage supplied to the output control circuit IC102 is reduced but is sufficient to operate the circuit. After being supplied with a starting voltage, the output control circuit IC102 alternately drives power transistors Q104 and Q105 in order to provide an AC voltage across the primary winding 26*a* of the main output transformer 26, which results in a corresponding voltage on the secondary windings of the main output transformer 26.

The corresponding voltage produced on the secondary winding 40 of transformer 26 provides an operating voltage for the start-up circuit 38. The first voltage doubling rectifier circuit, which comprises rectifying diodes D103 and D104, is electrically connected to a secondary winding of the main output transformer 26 denoted 40 and because the operating voltage is provided across the secondary winding 40, the first voltage rectifier circuit receives the operating voltage. The first voltage doubling rectifier circuit provides a bias voltage to the power factor correcting circuit IC101.

In addition, the second voltage doubling rectifier circuit, which comprises rectifying diodes D105 and D106, is also electrically connected to the secondary winding 40 of the main output transformer 26 and because the operating voltage is provided across the secondary winding 40, the second voltage rectifier circuit also receives this operating voltage. The second voltage doubling rectifier circuit provides a bias voltage to the output control circuit IC102.

When the input power factor correction section 18 is fully operating, the converted DC power is then boosted to a final value which is applied across the primary winding of the main output transformer 26 via the switching unit 24. The boosted converted DC power on the primary winding 26*a* of the main output transformer 26 produces a corresponding boosted operating voltage on the secondary windings of the main output transformer 26. Because the voltage doubling rectifier circuits are connected to one of the secondary windings (winding 40), a safe bias voltage is provided to both the input power factor correction section 18 and the output power conditioning section 28. The boosted operating voltage is sufficient to ignite the FGDL 32.

There is a substantial difference in the voltage supplied to the output power conditioning section 28 between the time of first start-up and the time when the input power factor correction section 18 boosts the voltage present on output capacitor C118. When the input power factor correction section 18 boosts the converted DC power, the switching unit 24 receives a higher voltage supply than at initial start-up. When the first few pulses of voltage are applied to the primary winding of the main output transformer 26, there is effectively a DC component of the voltage that is applied across the primary winding due to the unipolar nature of the first one half cycle that is generated. This component could saturate the main output transformer 26 core and possibly damage the switching unit 24. The start-up sequence described above is designed to prevent such damage from occurring, by allowing the first pulses to occur under conditions of a voltage level that is less than the normal running value.

As shown in FIG. 2, the start-up circuit 38 includes impedance elements C111, C112, R111, R112, C113, C114, R113, and R114, which are connected between the secondary winding of the main output transformer 26 and rectifying diodes D103–D106. The shunt regulating elements Z 01 and Z102 regulate and limit the bias voltage supplied to the power factor correcting circuit IC101 and the output control circuit IC102. The values of the impedance elements are selected to provide sufficient voltage to operate the output control circuit IC102 and the power factor correcting circuit IC101 before the boost operation is initiated and to limit the currents supplied to the regulating elements for the power factor correcting circuit IC101 and the output control circuit IC102 when the boosting begins.

Although the invention showed is evident from the foregoing, briefly summarizing the overall operation, AC input power is first converted to DC power by converter 14. Current flows through resistor R110 and capacitor C119. As a result of current flowing through capacitor C119, capacitor C119 is charged and provides a starting voltage to the output control circuit IC102. The output control circuit IC102 alternately drives power transistors Q104 and Q105 in order to provide converted DC power across the primary winding 26*a* of the main output transformer 26 so as to produce a resultant operating voltage on a secondary winding 40 of the main output transformer 26. Rectifying diodes D103–D106 receive the operating voltage and provide a bias voltage to the power factor correction circuit IC101 and the output power control circuit IC102. The power factor correction circuit IC101 receives the bias voltage and drives switching transistor Q101 in order to connect and disconnect inductor L102 to and from the converted DC power so as to produce boosted converted DC power. The boosted converted DC power is applied across the primary winding 26*a* of the main output transformer 26 so as to provide a resultant boosted operating voltage on the secondary winding 40 of the main output transformer 26. Zener diodes Z101 and Z102 are electrically connected to the power factor correcting circuit IC101 and the output control circuit IC102, respectively. The zener diodes Z101 and Z102 receive the operating voltage and the boosted operating voltage and regulate and limit the operating voltage and the boosted operating voltage in order to provide a bias voltage to the power factor correcting circuit IC101 and the output control circuit IC102.

Although the invention has been described above in relation to preferred embodiments thereof, it will be understood by those skilled in the art that variations and modifications can be effected in these preferred embodiments without departing from the scope and spirit of the invention.

What is claimed is:

1. A control system for providing variable arc current control of a lighting system, said control system comprising:

an input power factor correction means including means for converting AC power from an AC power source into converted DC power, said input power factor correction means boosting said converted DC power so as to provide boosted converted DC power;

a lamp unit comprising at least one fluorescent gas discharge lamp;

switching means for controlling application of said boosted converted DC power to said lamp unit;

an output power conditioning means, connected to said input power factor correction means and to said switching means, for controlling operation of said switching means so as to control application of said converted DC power to said lamp unit; and a start-up circuit including a starting means for providing a starting voltage to said output power conditioning means, said start-up circuit further comprising a plurality of voltage doubling rectifier circuits for providing a bias voltage supply to said output power conditioning means and to said input power factor correction means.

2. The control system according to claim 1, wherein said at least one fluorescent gas discharge lamp includes electrodes and said output power conditioning means supplies a heating voltage for said electrodes of said at least one arc discharge lamp.

3. The control system according to claim 1, wherein said output power conditioning means supplies arc current for said lamp unit.

4. The control system according to claim 1, wherein said input power factor correction means and said output power conditioning means comprise integrated circuits.

5. The control system according to claim 1, wherein said switching means provides alternate application of positive and negative DC voltages to said lamp unit.

6. The control system according to claim 1, wherein said output power conditioning means further comprises a feedback means for sensing light of said lamp unit and automatically adjusting the current level supplied to said lamp unit in accordance with the sensed light of said lamp unit.

7. The control system according to claim 1, wherein said input power factor correction means includes an analog multiplier connected to a switching transistor for driving said switching transistor with a variable frequency pulse in order to control said boosting of said converted DC power.

8. The control system according to claim 7, wherein said feedback means includes at least one photoresistor electrically connected to at least one capacitor in order to form an RC time constant circuit.

9. The control system according to claim 1, wherein one of said plurality of voltage doubling rectifier circuits of said start-up circuit is electrically connected to said input power factor correction means.

10. The control system according to claim 9, wherein a further one of said plurality of voltage doubling rectifier circuits of said start-up circuit is electrically connected to said output power conditioning means.

11. The control system according to claim 10, wherein said one of said plurality of voltage doubling rectifier circuits comprises a first pair of diodes.

12. The control system according to claim 11, wherein said further one of said plurality of voltage doubling rectifier circuits comprises a second pair of diodes.

13. The control system according to claim 12, wherein said starting means includes a resistor electrically connected in series with a capacitor for providing said starting voltage to said output power conditioning means.

14. The control system according to claim 13, wherein said start-up circuit includes a first zener diode electrically connected to said input power factor correction means so as to limit and regulate said bias voltage supply.

15. control system according to claim 14, wherein said start-up circuit includes a second zener diode electrically connected to said output power conditioning means so as to limit and regulate said bias voltage supply.

16. A control system for providing variable arc current control of a lighting system, said control system comprising:

an input power factor correction means including a means for converting AC power from an AC power source into converted DC power, said input power factor correction means boosting said converted DC power so as to provide boosted converted DC power;

at least one lamp unit comprising at least one fluorescent gas discharge lamp including electrodes;

a main output transformer having a primary winding and at least one secondary winding, said primary winding being connected to said input power factor correction means and said at least one secondary winding being connected to said electrodes and to said at least one lamp unit;

a switching means connected to said primary winding of said main output transformer;

output power conditioning means, connected to said input power factor correction means, and to said switching means, for controlling said switching means to provide voltage to said primary winding of said main output transformer so as to produce a resultant voltage on said at least one secondary winding of said main output transformer and thus provide a heating voltage to said electrodes and variable arc current to said at least one lamp unit; and a start-up circuit including a starting means for providing a starting voltage to said output power conditioning means, said start-up circuit further comprising a plurality of voltage doubling rectifier circuits for providing a bias voltage supply to said output power conditioning means and to said input power factor correction means.

17. The control system according to claim 16, wherein said starting means includes a resistor electrically connected in series with a capacitor for providing a starting voltage to said output power conditioning means.

18. The control system according to claim 16, wherein said start-up circuit includes a first zener diode electrically connected to said input power factor correction means so as to limit and regulate said bias voltage supply.

19. The control system according to claim 16, wherein said start-up circuit includes a second zener diode electrically connected to said output power conditioning means so as to limit and regulate said bias voltage supply.

20. A control system for providing variable arc control of a lighting system including at least one lamp unit, said control system comprising:

converting means for converting AC power from an AC power source into converted DC power, said converting means including an input power factor correction means for boosting said converted DC power to produce boosted DC power;

switching means for controlling application of said converted DC power to the at least one lamp unit;

output power conditioning means connected to said switching means for controlling operation of said switching means; and a start-up circuit connected to said input power factor correction means and to said output power conditioning means, said start-up circuit including:

a starting means for providing a starting voltage to said output power conditioning means so as to control said switching means to provide an operating voltage to said input power factor correction means to produce a boosted operating voltage;

a first voltage doubling rectifier circuit and a first zener diode electrically connected to said input power factor correction means for receiving said boosted operating voltage and for providing a regulated bias voltage supply to said input power factor correction means; and a second voltage doubling rectifier circuit and a second zener diode electrically connected to said output power conditioning means for receiving said boosted operating voltage and for providing a regulated bias voltage supply to said output power conditioning means.

* * * * *